United States Patent
Ren et al.

(10) Patent No.: US 11,054,633 B2
(45) Date of Patent: Jul. 6, 2021

(54) MIRROR ASSEMBLY, CONTROL METHOD THEREOF AND LIGHT ADJUSTING BOARD

(71) Applicants: BEIJING BOE DISPLAY TECHNOLOGY CO., LTD., Beijing (CN); BOE TECHNOLOGY GROUP CO., LTD., Beijing (CN)

(72) Inventors: Jinyu Ren, Beijing (CN); Bo Zhou, Beijing (CN); Yongzhi Song, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/574,348

(22) Filed: Sep. 18, 2019

(65) Prior Publication Data
US 2020/0310109 A1 Oct. 1, 2020

(30) Foreign Application Priority Data

Mar. 28, 2019 (CN) .......................... 201910244972.8

(51) Int. Cl.
G02B 26/08 (2006.01)
(52) U.S. Cl.
CPC ................ G02B 26/0833 (2013.01)
(58) Field of Classification Search
CPC ...... G02B 26/08; G02B 26/00; G02B 26/105; G02B 26/0833; G02B 26/0841
(Continued)

(56) References Cited

U.S. PATENT DOCUMENTS 6,633,426 B2 * 10/2003 Shrauger ............... B81B 7/0006
257/415
7,330,297 B2 2/2008 Noh et al.
(Continued)

FOREIGN PATENT DOCUMENTS

| CN | 1788222 | 6/2006 |
|---|---|---|
| CN | 101029965 | 9/2007 |

(Continued)

OTHER PUBLICATIONS

Chinese Patent Office Action dated Oct. 28, 2020 corresponding to Chinese Patent Application No. 201910244972.8; 19 pages.

*Primary Examiner* — Hung Nguyen
(74) *Attorney, Agent, or Firm* — Leason Ellis LLP

(57) ABSTRACT

A mirror assembly, a control method thereof and a light adjusting board are provided. The mirror assembly includes a mirror, a first rotation electrode, a second rotation electrode, a first electrode, a second electrode, a third electrode and a fourth electrode. The mirror includes a rotation axis; the first rotation electrode and the second rotation electrode are respectively at two sides of the rotation axis; the first electrode and the second electrode are opposite to form a first electric field; the first rotation electrode is between the first electrode and the second electrode; the third electrode and the fourth electrode are opposite to form a second electric field; the second rotation electrode is between the third electrode and the fourth electrode; the first rotation electrode and the second rotation electrode rotate under the two electric fields to drive the mirror to rotate around the rotation axis.

20 Claims, 11 Drawing Sheets

(58) Field of Classification Search
USPC .................................................. 359/290–292
See application file for complete search history.

(56) References Cited

U.S. PATENT DOCUMENTS

| | | |
|---|---|---|
| 2002/0167712 A1 | 11/2002 | Shrauger et al. |
| 2005/0117196 A1* | 6/2005 | Kimura .............. G02B 26/0841 359/291 |
| 2008/0144155 A1 | 6/2008 | Pan |
| 2008/0186550 A1 | 8/2008 | Meuwese et al. |
| 2017/0205624 A1* | 7/2017 | Naono .................. B81B 3/0043 |

FOREIGN PATENT DOCUMENTS

| | | |
|---|---|---|
| CN | 101107195 | 1/2008 |
| CN | 101133353 | 2/2008 |
| CN | 101324704 | 12/2008 |
| JP | 2004101822 | 4/2004 |
| TW | 201024204 | 7/2010 |

\* cited by examiner

MIRROR ASSEMBLY, CONTROL METHOD THEREOF AND LIGHT ADJUSTING BOARD

The present application claims priority of Chinese Patent Application No. 201910244972.8, filed on Mar. 28, 2019, the disclosure of which is incorporated herein by reference in its entirety as part of the present application.

TECHNICAL FIELD

Embodiments of the present disclosure relate to a mirror assembly, a control method thereof and a light adjusting board.

BACKGROUND

A Micro-Electro-Mechanical System (MEMS), a size of an internal structure of which is usually at a micron level or even nanometer level, is an independent intelligent system, and usually includes three parts: a sensor, an actuator and a micro-energy. At present, the MEMS can apply mechanical forces or electrostatic forces to a micro-mirror, a size of which is at a micron level or a nanometer level, to rotate the micro-mirror around an axis in a certain direction, thereby adjusting laser incident on the micro-mirrors for imaging. The micro-mirrors can be applied to laser radar, 3D camera, bar code scanning, laser printer, medical imaging, and can also be applied to digital display, such as high definition television, laser micro-projection, digital cinema, car head-up display (HUD), laser keyboard, augmented reality (AR), etc.

SUMMARY

At least one embodiment of the present disclosure provides a mirror assembly which includes a mirror, a first rotation electrode, a second rotation electrode, a first electrode, a second electrode, a third electrode and a fourth electrode. The mirror includes a mirror surface and a rotation axis in the mirror surface; an orthographic projection of the first rotation electrode and an orthographic projection of the second rotation electrode on a plane where the mirror surface is located are respectively at two sides of the rotation axis, and a connection line connecting the first rotation electrode and the second rotation electrode is perpendicular to the rotation axis; a first electrode and a second electrode are opposite to each other to form a first electric field, and the first rotation electrode is between the first electrode and the second electrode so that the first rotation electrode is in the first electric field; a third electrode and a fourth electrode are opposite to each other to form a second electric field, and the second rotation electrode is between the third electrode and the fourth electrode so that the second rotation electrode is in the second electric field; and the first rotation electrode and the second rotation electrode are configured to rotate under a control of the first electric field and the second electric field, to drive the mirror to rotate around the rotation axis.

For example, the mirror assembly provided by an embodiment of the present disclosure further includes: a first substrate and a second substrate which are opposite to each other; the first electrode and the third electrode are on the first substrate, and the second electrode and the fourth electrode are on the second substrate; and the mirror, the first rotation electrode and the second rotation electrode are between the first substrate and the second substrate.

For example, in the mirror assembly provided by an embodiment of the present disclosure, an orthographic projection of the first rotation electrode on the first substrate at least partially overlaps the first electrode and at least partially overlaps an orthographic projection of the second electrode on the first substrate; and an orthographic projection of the second rotation electrode on the first substrate at least partially overlaps the third electrode and at least partially overlaps an orthographic projection of the fourth electrode on the first substrate.

For example, the mirror assembly provided by an embodiment of the present disclosure further includes a platform having a rotation axis and a first surface; an orthographic projection of the rotation axis of the platform on the plane where the mirror surface is located coincides with the rotation axis of the mirror; and the first surface is a surface of the platform facing the first rotation electrode, the second rotation electrode and the mirror; the mirror, the first rotation electrode and the second rotation electrode are on the first surface of the platform, and the first rotation electrode and the second rotation electrode are configured to rotate to drive the platform to rotate so as to drive the mirror to rotate.

For example, the mirror assembly provided by an embodiment of the present disclosure further includes a supporting rotation structure comprising an end rotationally connected with the platform; the end of the supporting rotation structure is on the rotation axis of the platform.

For example, in the mirror assembly provided by an embodiment of the present disclosure, a groove is on a second surface, which the second surface is opposite to the first surface, of the platform, and an inner wall of the groove is a first spherical surface; the supporting rotation structure comprises a supporting potion and a rotation potion connected with the supporting potion, the rotation potion comprises the end of the supporting rotation structure, a shape of the rotation potion is a sphere, the sphere comprises a second spherical surface, and at least a portion of the second spherical surface is in the groove; and the second spherical surface is configured to be rotatable relative to the first spherical surface.

For example, in the mirror assembly provided by an embodiment of the present disclosure, the first spherical surface is larger than a hemisphere and the second spherical surface is larger than a hemisphere.

For example, in the mirror assembly provided by an embodiment of the present disclosure, the platform comprises a first portion and a second portion connected to each other; the first potion comprises a first sub-groove, and an inner wall of the first sub-groove is a first sub-spherical surface; the second potion comprises a second sub-groove, and an inner wall of the second sub-groove is a second sub-spherical surface; and the groove is a combination of the first sub-groove and the second sub-groove.

For example, in the mirror assembly provided by an embodiment of the present disclosure, the first sub-spherical surface is smaller than a hemispherical surface and larger than a quarter spherical surface, and the second sub-spherical surface is smaller than a hemispherical surface and larger than a quarter spherical surface.

For example, in the mirror assembly provided by an embodiment of the present disclosure, a planar shape of the platform is a circle, and the end of the supporting rotation structure is at a center of the circle.

For example, in the mirror assembly provided by an embodiment of the present disclosure, the first rotation electrode, the second rotation electrode and the mirror are in a same layer, and the mirror surface is substantially parallel to the first surface of the platform; or, the mirror assembly further comprises a flat layer covering the first rotation electrode and the second rotation electrode, the mirror is on the flat layer, and the mirror surface is substantially parallel to the first surface of the platform; or, the first rotation electrode and the second rotation electrode are on the mirror.

For example, in the mirror assembly provided by an embodiment of the present disclosure, the mirror surface includes a plurality of rotation axes, the plurality of rotation axes intersect to each other, and the first rotation electrode, the second rotation electrode, the first electrode, the second electrode, the third electrode and the fourth electrode are provided for each of the plurality of rotation axes.

For example, in the mirror assembly provided by an embodiment of the present disclosure, a planar shape of the mirror is a circle, and the plurality of first rotation electrodes and the plurality of second rotation electrodes are arranged along a concentric ring of the circle.

For example, in the mirror assembly provided by an embodiment of the present disclosure, a direction of the first electric field is opposite to a direction of the second electric field, a direction of an electric field force received by the first rotation electrode in the first electric field is identical to a direction of an electric field force received by the second rotation electrode in the second electric field and a value of the electric field force received by the first rotation electrode in the first electric field is different from a value of the electric field force received by the second rotation electrode in the second electric field, so as to rotate the first rotation electrode and the second rotation electrode to drive the mirror to rotate around the rotation axis; or, the direction of the first electric field is identical to the direction of the second electric field, and the direction of the electric field force received by the first rotation electrode in the first electric field is opposite to the direction of t the electric field force received by the second rotation electrode in the second electric field so as to rotate the first rotation electrode and the second rotation electrode to drive the mirror to rotate around the rotation axis.

For example, in the mirror assembly provided by an embodiment of the present disclosure, the orthographic projection of the first rotation electrode on the first substrate at least partially overlaps the first electrode and at least partially overlaps an orthographic projection of the second electrode on the first substrate; the orthographic projection of the second rotation electrode on the first substrate at least partially overlaps the third electrode and at least partially overlaps an orthographic projection of the fourth electrode on the first substrate; the mirror assembly further comprises: a platform having a rotation axis and a first surface, wherein an orthographic projection of the rotation axis of the platform on the plane where the mirror surface is located coincides with the rotation axis of the mirror; and the first surface is a surface of the platform facing the first rotation electrode; the second rotation electrode and the mirror, the mirror, the first rotation electrode and the second rotation electrode are on the first surface of the platform, and the first rotation electrode and the second rotation electrode are configured to rotate to drive the platform to rotate so as to drive the mirror to rotate; and a supporting rotation comprising an end structure rotationally connected with the platform; the end of the supporting rotation is on the rotation axis of the platform; a groove is on a second surface, which is opposite to the first surface, of the platform, and an inner wall of the groove is a first spherical surface; the supporting rotation structure comprises a supporting potion and a rotation potion connected with the supporting potion, the rotation potion comprises the end of the supporting rotation structure, a shape of the rotation potion is a sphere, the sphere comprises a second spherical surface, and at least a portion of the second spherical surface is in the groove; and the second spherical surface is configured to be rotatable relative to the first spherical surface; the first spherical surface is larger than a surface of a hemisphere and the second spherical surface is larger than a surface of a hemisphere; a planar shape of the platform is a circle, and the end of the supporting rotation structure is at a center of the circle; the mirror surface comprises a plurality of rotation axes, the plurality of the rotation axes intersect to each other, and the first rotation electrode, the second rotation electrode, the first electrode, the second electrode, the third electrode, and the fourth electrode are provided for each of the plurality of rotation axes; and a planar shape of the mirror is a circle, and the plurality of first rotation electrodes and the plurality of second rotation electrodes are arranged along a concentric ring of the circle.

At least one embodiment of the present disclosure also provides a light adjusting board, which includes a plurality of mirror assemblies according to claim 1, wherein the plurality of the mirror assemblies are arranged in an array and are independently controlled.

For example, the light adjusting board provided by an embodiment of the present disclosure further includes a micro-electro-mechanical system configured to control electrical signals respectively applied to the first rotation electrode, the second rotation electrode, the first electrode, the second electrode, the third electrode and the fourth electrode.

At least one embodiment of the present disclosure also provides a control method of a mirror assembly, which is applicable to any one of the mirror assemblies provided by the embodiment of the present disclosure, and the control method includes: applying a voltage to the first rotation electrode and applying a voltage to the second rotation electrode so that the first rotation electrode and the second rotation electrode are respectively positively charged and negatively charged; and applying a first voltage to the first electrode and applying a second voltage to the second electrode to form the first electric field, and applying a third voltage to the third electrode and applying a fourth voltage to the fourth electrode to form the second electric field to rotate the first rotation electrode and the second rotation electrode to drive the mirror to rotate around the rotation axis.

For example, in the control method of the mirror assembly provided by an embodiment of the present disclosure, by adjusting the first voltage, the second voltage, the third voltage and the fourth voltage, a direction of the first electric field is opposite to a direction of the second electric field, a direction of the electric field force received by the first rotation electrode in the first electric field is identical to a direction of the electric field force received by the second rotation electrode in the second electric field, and a value of the electric field force received by the first rotation electrode in the first electric field is different from a value of the electric field force received by the second rotation electrode in the second electric field, so that the first rotation electrode and the second rotation electrode rotate around the rotation axis of the mirror to drive the mirror to rotate around the rotation axis of the mirror; or by adjusting the first voltage, the second voltage, the third voltage and the fourth voltage, the direction of the first electric field is identical to the direction of the second electric field, the direction of the electric field force received by the first rotation electrode in the first electric field is opposite to the direction of the electric field force received by the second rotation electrode in the second electric field, so that the first rotation electrode and the second rotation electrode rotate around the rotation axis of the mirror to drive the mirror to rotate around the rotation axis.

For example, in the control method of the mirror assembly provided by an embodiment of the present disclosure, the direction of the first electric field is opposite to the direction of the second electric field, after the mirror is rotated to a light control position, the direction of the first electric field is kept opposite to the direction of the second electric field by adjusting the first voltage, the second voltage, the third voltage and the fourth voltage, so as to kept the direction of the electric field force received by the first rotation electrode in the first electric field opposite to the direction of the electric field force received by the second rotation electrode in the second electric field, and the value of the electric field force received by the first rotation electrode in the first electric field and/or the value of the electric field force received by the second rotation electrode in the second electric field are adjusted to keep the mirror at the light control position; or the direction of the first electric field is identical to the direction of the second electric field, after the mirror is rotated to the light control position, the direction of the first electric field is turned to be opposite to the direction of the second electric field by adjusting the first voltage, the second voltage, the third voltage and the fourth voltage, so that the direction of the electric field force received by the first rotation electrode in the first electric field is opposite to the direction of the electric field force received by the second rotation electrode in the second electric field, and the value of the electric field force received by the first rotation electrode in the first electric field and/or the value of the electric field force received by the second rotation electrode in the second electric field are adjusted to keep the mirror at the light control position.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1A:
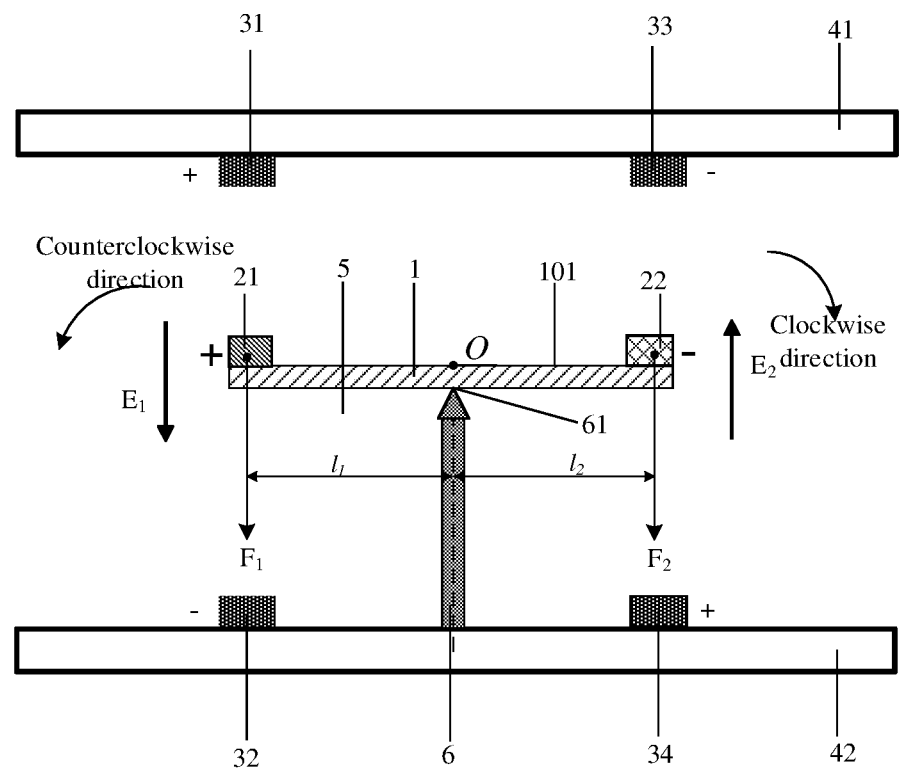
FIG. 1A is a structural schematic diagram of a mirror assembly provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Inside" "outside" "on," "under," "right," "left" and the like are only used to indicate relative position relationship, and when the position of the object which is described is changed, the relative position relationship may be changed accordingly.

The drawings in the disclosure are not drawn according to actual proportions or scales, and the numbers of the first rotation electrode, the second rotation electrode, the first electrode, the second electrode, the third electrode and the fourth electrode in the mirror assembly are not limited to those illustrated in the drawings, and the specific size and number of each structure can be determined according to actual needs. The drawings described in the disclosure are only structural schematic diagrams.

It should be noted that "light control position" in the disclosure refers to a position where a mirror can adjust light incident on a mirror surface as required, and the light control position can be adjusted as required.

At least one embodiment of the present disclosure provides a mirror assembly, which includes a mirror, a first rotation electrode, a second rotation electrode, a first electrode, a second electrode, a third electrode and a fourth electrode. The mirror includes a mirror surface and a rotation axis in the mirror surface; an orthographic projection of the first rotation electrode and an orthographic projection of the second rotation electrode on a plane where the mirror surface is located are respectively at two sides of the rotation axis, and a connection line connecting the first rotation electrode and the second rotation electrode is perpendicular to the rotation axis; a first electrode and a second electrode are opposite to each other to form a first electric field, and the first rotation electrode is between the first electrode and the second electrode so that the first rotation electrode is in the first electric field; a third electrode and a fourth electrode are opposite to each other to form a second electric field, and the second rotation electrode is between the third electrode and the fourth electrode so that the second rotation electrode is in the second electric field; and the first rotation electrode and the second rotation electrode are configured to rotate under a control of the first electric field and the second electric field, to drive the mirror to rotate around the rotation axis.

Figure 1B:
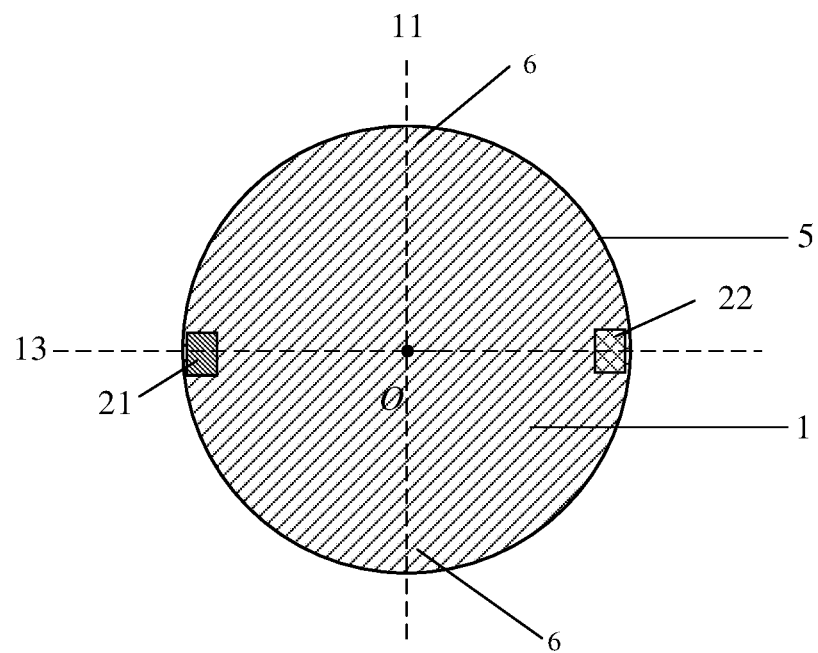
FIG. 1B is a planar schematic diagram of the mirror assembly as illustrated in FIG. 1A.

Illustratively, FIG. 1A is a structural schematic diagram of a mirror assembly provided by an embodiment of the disclosure, and FIG. 1B is a planar schematic diagram of the mirror assembly as illustrated in FIG. 1A. As illustrated in FIGS. 1A and 1B, the mirror assembly includes a mirror 1, a first rotation electrode 21 and a second rotation electrode 22, a first electrode 31 and a second electrode 32, a third electrode 33 and a fourth electrode 34. The mirror 1 includes a mirror surface 101 and a rotation axis 11 located in the mirror surface 101. As illustrated in FIG. 1B, an orthographic projection of the first rotation electrode 21 and an orthographic projection of the second rotation electrode 22 on a plane where the mirror surface 101 is located are respectively at two sides of the rotation axis 11, and a connection line 13 connecting the first rotation electrode 21 and the second rotation electrode 22 is perpendicular to the rotation axis 11. The first electrode 31 and the second electrode 32 are opposite to each other to form a first electric field, and the first rotation electrode 21 is between the first electrode 31 and the second electrode 32 so that the first rotation electrode 21 is in the first electric field; the third electrode 33 and the fourth electrode 34 are opposite to each other to form a second electric field, and the second rotation electrode 22 is between the third electrode 33 and the fourth electrode 34 so that the second rotation electrode 22 is in the second electric field. The first rotation electrode 21 and the second rotation electrode 22 are configured to rotate under a control of the first electric field and a control of the second electric field to drive the mirror 1 to rotate around the rotation axis 11. In a case where the first rotation electrode 21 and the second rotation electrode 22 are charged by applying different electric signals, the first rotation electrode 21 and the second rotation electrode 22 are respectively controlled by electric field forces in the first electric field and the second electric field. The electric field forces are, for example, a first electric field force $F_1$ and a second electric field force $F_2$ as illustrated in FIG. 1A. the first electric field force $F_1$ and the second electric field force $F_2$ generate torques which enable the first rotation electrode 21 and the second rotation electrode 22 to rotate around the rotation axis 11, thereby driving the mirror 1 to rotate around the rotation axis 11, that is, both the first rotation electrode 21 and the second rotation electrode 22 rotate in a clockwise direction or a counterclockwise direction as illustrated in FIG. 1A. Thus, the mirror 1 can rotate under the control of the electric field forces to adjust the light incident to the mirror surface 101, for example, for imaging. The mirror assembly provided by the embodiment of the disclosure can be applied to laser radar, 3D camera, bar code scanning, laser printer, medical imaging, and can also be applied to digital display, such as high definition television, laser micro-projection, digital cinema, car head-up display (HUD), laser keyboard, augmented reality (AR), etc.

For example, the mirror assembly further includes a first substrate 41 and a second substrate 42 which are opposite to each other, the first electrode 31 and the third electrode 33 are on the first substrate 41, and the second electrode 32 and the fourth electrode 34 are on the second substrate 42. The mirror 1, the first rotation electrode 21, and the second rotation electrode 22 are between the first substrate 41 and the second substrate 42. Therefore, the mirror 1 can rotate in a space between the first substrate 41 and the second substrate 42. For example, the first electrode 31 and the third electrode 33 are on a surface, which faces the mirror 1, of the first substrate 41 mirror; the second electrode 32 and the fourth electrode 34 are on a surface, which faces the mirror 1, of the second substrate 42 mirror. Of course, in other embodiments, the first electrode 31 and the third electrode 33 may also be on a surface, which faces away the mirror 1, of the first substrate 4 1mirror, and the second electrode 32 and the fourth electrode 34 may also be on a surface, which faces away the mirror 1, of the second substrate 42.

For example, an orthographic projection of the first rotation electrode 21 on the first substrate 41 at least partially overlaps the first electrode 31 and at least partially overlaps an orthographic projection of the second electrode 32 on the first substrate 41. An orthographic projection of the second rotation electrode 22 on the first substrate 41 at least partially overlaps the third electrode 33 and at least partially overlaps an orthographic projection of the fourth electrode 34 on the first substrate 41. Therefore, it is guaranteed that the first electric field generated by the first electrode 31 and the second electrode 32 acts on the first rotation electrode 21, and the second electric field generated by the third electrode 33 and the fourth electrode 34 acts on the second rotation electrode 22, so that an effect of the first electric field on the first rotation electrode 21 is better, and an effect of the second electric field on the second rotation electrode 22 is better.

For example, the mirror assembly further includes a supporting rotation structure 6 comprising an end 61 rotationally connected to the mirror 1 and the end 61 is on the rotation axis 11 of the mirror 1, that is, an orthographic projection of the supporting rotation structure 6 on the mirror surface at least partially overlaps with the rotation axis 11. The supporting rotation structure 6 enables that a first distance is formed between the mirror 1 and the first substrate 41 and a second distance is formed between the mirror 1 and the second substrate 42, so that the mirror 1 has a sufficient space to rotate. In addition, the supporting rotation structure 6 is configured to enable the mirror 1 to rotate around the rotation axis 11. For example, an end, which is close to the mirror 1, of the supporting rotation structure 6 mirror is referred as a fulcrum of the mirror 1. For example, referring to FIG. 1B, the mirror assembly includes two supporting rotation structures 6, each of the two supporting rotation structures 6 has the end rotationally connected with the platform, and the ends respectively of the two supporting rotation structures 6 are both on the rotation axis 11 and are respectively at two sides of the connection line 13 which connects the first rotation electrode 21 and the second rotation electrode 22, thus contributing to enhancing the stability of the mirror surface.

For example, in the state as illustrated in FIG. 1A, the entire supporting rotation structure 6 is perpendicular to the mirror surface 101. For example, the first rotation electrode 21 and the second rotation electrode 22 are at an edge of the mirror 1 to maximize a distance between the first rotation electrode 21 and the rotation axis 11, and maximize a distance between the second rotation electrode 22 and the rotation axis 11, thereby maximizing a force arm $l_1$ of the first electric field force $F_1$ and a force arm $l_2$ of the second electric field force $F_2$ in which the first electric field force $F_1$ and the second electric field force $F_2$ drive the mirror 1 to rotate around the rotation axis 11, so that in a case where other conditions are same, generating a smaller first electric field force $F_1$ or a smaller first electric field force $F_2$ can enable the first rotation electrode 21 and the second rotation electrode 22 to rotate around the rotation axis 11, thereby driving the mirror 1 to rotate around the rotation axis 11, that is, an electric field intensity $E_1$ of the first electric field and an electric field intensity $E_2$ of the second electric field can be smaller, so that the rotation of the mirror 1 is easy to realize and an energy consumption is small. For example, in other embodiments of the present disclosure, the first rotation electrode 21 and the second rotation electrode 22 may not be at the edge of the mirror 1 or an edge of a platform 5.

For example, a planar shape of the mirror 1 is a regular pattern or an irregular pattern, and the embodiment of the present disclosure is not limited to this. For example, in an example, as illustrated in FIG. 1B, the planar shape of the mirror 1 is a circle, and the supporting rotation structure 6 is at a center O of the circle, that is, the orthographic projection of the supporting rotation structure 6 on the mirror surface 101 overlaps the center O of the circle, which includes a case where an orthographic projection of the supporting rotation structure 6 on the mirror surface 101 mirror covers the center O and a case where the orthographic projection of the supporting rotation structure 6 on the mirror 1 has a geometric center and the geometric center is at the center O, that is, the geometric center is coincides with the center O. For example, in other embodiments, the planar shape of the mirror 1 may be rectangular, oval, or the like.

Figure 2A:
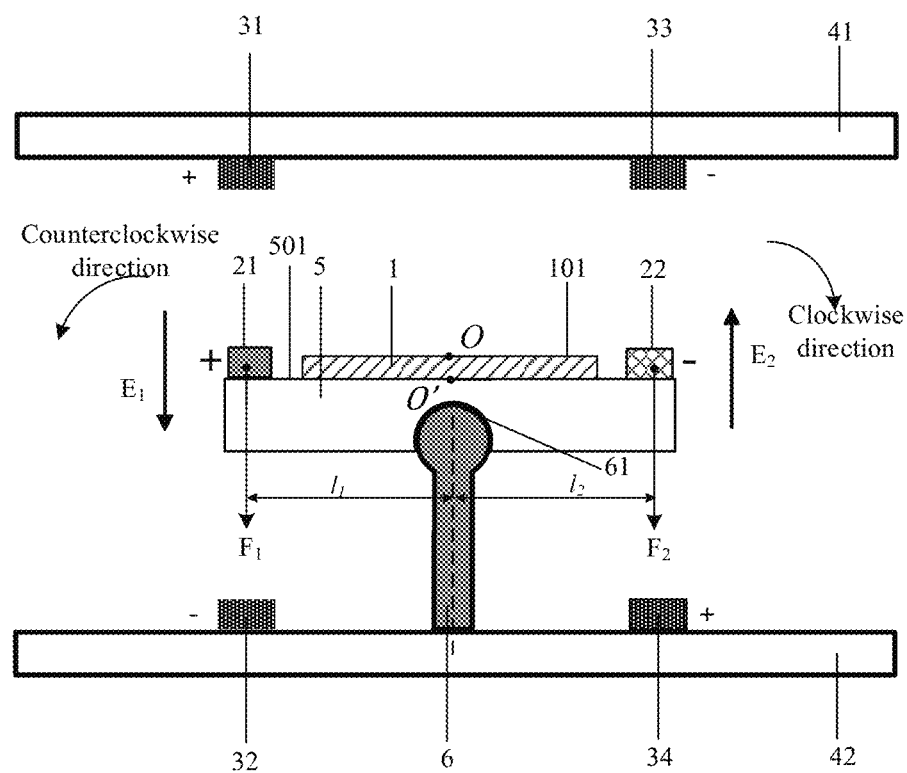
FIG. 2A is a structural schematic diagram of another mirror assembly provided by an embodiment of the present disclosure.
Figure 2B:
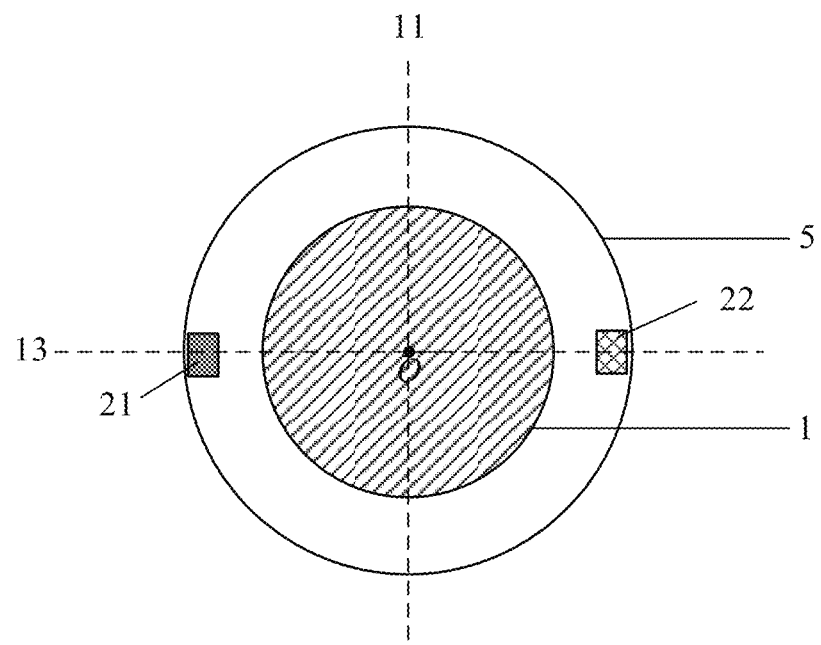
FIG. 2B is a planar schematic diagram of the mirror assembly as illustrated in FIG. 2A.

FIG. 2A is a structural schematic diagram of another mirror assembly provided by an embodiment of the disclosure, and FIG. 2B is a plan schematic diagram of the mirror assembly as illustrated in FIG. 2A. The mirror assembly as illustrated in FIGS. 2A and 2B has the following differences from the mirror assembly as illustrated in FIGS. 1A and 1B. For example, the mirror assembly further includes the platform 5 having a rotation axis and a first surface 501, an orthographic projection of the rotation axis of the platform 5 on a plane where the mirror surface 101 is located coincides with the rotation axis 11 of the mirror 1. The first surface 501 is a surface, which faces the first rotation electrode 21, the second rotation electrode 22 and the mirror 1, of the platform 5. The mirror 1, the first rotation electrode 21 and the second rotation electrode 22 are on the first surface 501 of the platform 5. The first rotation electrode 21 and the second rotation electrode 22 are configured to rotate to drive the platform 5 to rotate around the rotation axis of the platform 5 so as to drive the mirror 1 to rotate around the rotation axis 11.

For example, as illustrated in FIG. 2A, the mirror assembly further includes a supporting rotation structure 6 comprising an end which is rotationally connected to the platform 5 and is on the rotation axis of the platform 5 to realize the rotation of the platform 5. There are a first distance from the supporting rotation structure 6 to the first substrate 41 and a second distance from the supporting rotation structure 6 to the second substrate 42, and the supporting rotation structure 6 enables the platform 5 to rotate around the rotation axis of the platform 5, even if the platform 5 can rotate in the space between the first substrate 41 and the second substrate 42.

For example, a planar shape of the platform 5 is a circle, and the supporting rotation structure 6 is at a center O' of the circle. In a case where the planar shape of the platform 5 is circle, during the rotation of the mirror 1 around the rotation axis 11, the force arms of the electric field forces that play a role of rotating the mirror 1 around the rotation axis 11 are fixed, so that a calculation of the torques during the rotation of the mirror 1 is simplified to facilitate the regulation and control of the required electric field intensity E1 of the first electric field and the electric field intensity E2 of the second electric field. Of course, the planar shape of the platform 5 may also be rectangular, elliptical, irregular, etc.

Figure 2C:
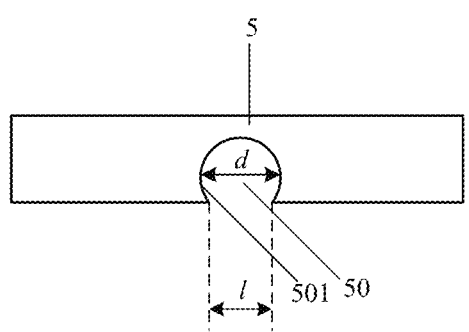
FIG. 2C is a schematic diagram of a platform of the mirror assembly as illustrated in FIG. 2A.
Figure 2D:
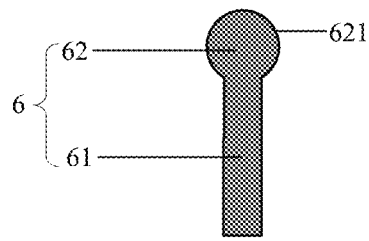
FIG. 2D is a schematic diagram of a supporting rotation structure of the mirror assembly as illustrated in FIG. 2A.

FIG. 2C is a schematic diagram of the platform of the mirror assembly as illustrated in FIG. 2A, and FIG. 2D is a schematic diagram of the supporting rotation structure of the mirror assembly as illustrated in FIG. 2A. For example, a second surface of the platform 5 opposite to the first surface 501 includes a groove 50, and a groove wall is a first spherical surface 501. The supporting rotation structure 6 includes a supporting portion 61 and a rotation portion 62 connected to the supporting portion 61. A shape of the rotation portion 62 is a sphere, the sphere includes a second spherical surface 621, and at least a portion of the second spherical surface 621 is in the groove 50. The second spherical surface 621 is configured to be rotatable relative to the first spherical surface 501 so that the platform 5 can rotate around the rotation axis of the platform 5. A 360° rotation of the platform 5 can be realized by the supporting rotation structure 6, so that the platform 5 can rotate around the rotation axes extending in multiple directions, and the mirror 1 can rotate around the rotation axes extending in multiple directions in the plane where the mirror surface 101 is located.

For example, a shape of the rotation portion 62 is an entire sphere or a part of a sphere. For example, the supporting portion 61 is cylindrical and is integral with the rotation portion 62 to simplify the structure of the mirror assembly. Of course, in other embodiments, the supporting portion 61 may not be integral with the rotation portion 62, and no limitation is imposed to this in the embodiments of the present disclosure.

For example, the first spherical surface 501 is larger than a surface of a hemisphere, and the second spherical surface 621 is larger than a surface of a hemisphere. In this way, it is possible to prevent the platform 5 from sliding off the supporting rotation structure 6. For example, the first spherical surface 501 includes an opening, a size l of the opening is smaller than a diameter d of the spherical rotation portion 62. For example, the opening is circular, that is, a planar shape of the opening is a circle, and a diameter of the circle is smaller than the diameter d of the rotation portion 62.

For example, as illustrated in FIG. 2A, the first rotation electrode 21, the second rotation electrode 22 and the mirror 1 are in a same layer, and the mirror surface 101 is substantially parallel to the first surface 501 of the platform 5. It should be noted that the term "the second rotation electrode 22 and the mirror 1 are in a same layer" refers to that there is no other layer between the second rotation electrode 22 and the mirror 1 in a direction perpendicular to the platform 5. For example, a surface, which faces the platform 5, of the second rotation electrode 22 and a surface, which faces the platform 5, of the mirror 1 are both in direct contact with the first surface 501 of the platform 5, that is, there is no other layer between this surface of the mirror 1 and the first surface 501.

Other features and technical effects of the mirror assembly as illustrated in FIGS. 2A and 2B are the same as those as illustrated in FIGS. 1A and 1B. Please refer to the description in the previous embodiment.

Figure 3A:
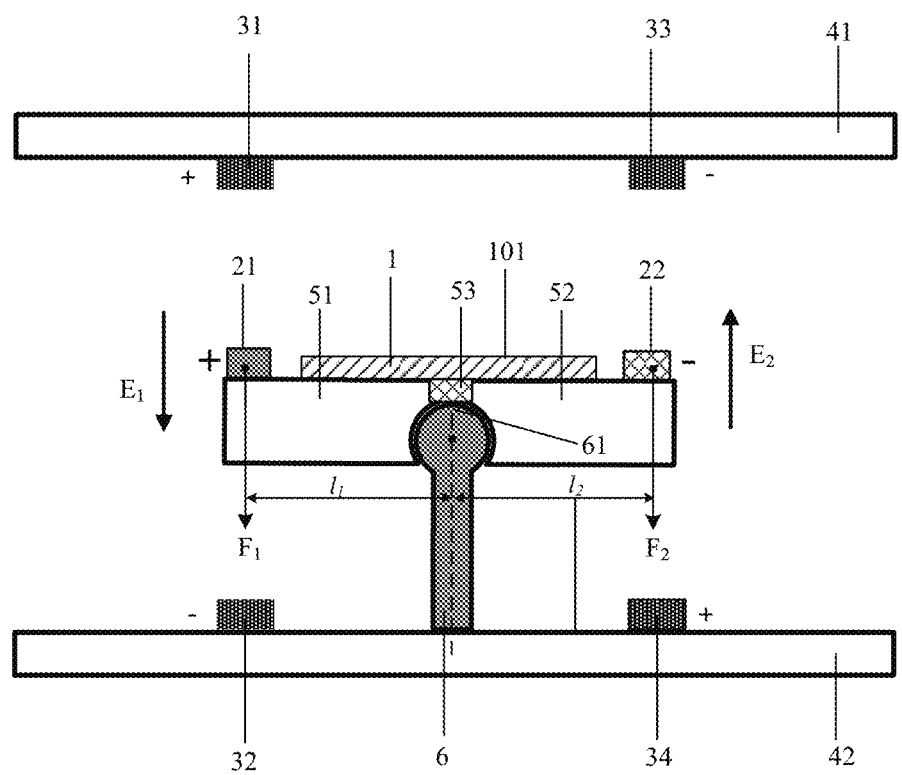
FIG. 3A is a structural schematic diagram of further another mirror assembly provided by an embodiment of the disclosure.
Figure 3B:
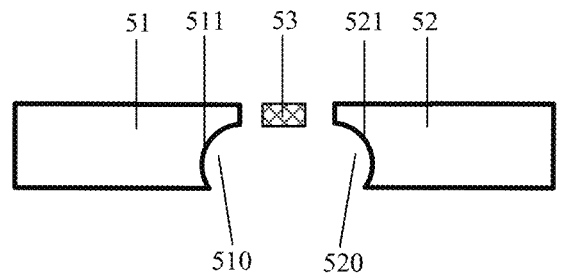
FIG. 3B is a schematic diagram of a platform of the mirror assembly as illustrated in FIG. 3A.

FIG. 3A is a structural schematic diagram of further another mirror assembly provided by an embodiment of the disclosure, and FIG. 3B is a schematic diagram of a platform of the mirror assembly as illustrated in FIG. 3A. The mirror assembly as illustrated in FIGS. 3A and 3B includes the following differences from the mirror assembly as illustrated in FIGS. 2A and 2B. For example, the platform 5 includes a first portion 51 and a second portion 52 which are connected to each other. The first portion 51 includes a first sub-groove 510, and an inner wall of the first sub-groove 510 is a first sub-spherical surface 511; and the second portion 52 includes a second sub-groove 520, and an inner wall of the second sub-groove 520 is a second sub-spherical surface 521. The groove 50 is a combination of the first sub-groove 510 and the second sub-groove 520 are combined into the groove 50. For example, the first sub-spherical surface 511 is smaller than a hemispherical surface and larger than a ¼ spherical surface, and the second sub-spherical surface 521 is smaller than a hemispherical surface and larger than a ¼ spherical surface. For example, a size and the shape of the first sub-spherical surface 511 are respectively identical to a size and a shape of the second sub-spherical surface 521, so that the first sub-spherical surface 511 and the second sub-spherical surface 521 are symmetrical to each other. Thus, two ends of the platform respectively provided with the first rotation electrode 21 and the second rotation electrode 22 are symmetrical, and the force conditions at the two ends of the platform are the same. Therefore, it is convenient to calculate values of respective electric field intensities and values of electric signals applied to respective electrodes during the flat rotation, and it is also convenient to manufacture the first sub-spherical surface 511 and the second sub-spherical surface 521.

For example, the platform 5 further includes a third portion 53 connecting the first portion 51 and the second portion 52. For example, the third portion 53 is any structure capable of connecting the first portion 51 and the second portion 52, and the third portion 53 is rigid, which is beneficial to maintaining the accuracy of the position of the mirror 1 during the rotation of the mirror 1. For example, the third portion 53 is an adhesive that bonds the first portion 51 and the second portion 52, or a welded portion that welds the first portion 51 and the second portion 52 together. No limitation is imposed to the specific type of the third portion 53 in the embodiment of the present disclosure.

Other features and technical effects of the mirror assembly as illustrated in FIGS. 3A and 3B are the same as those as illustrated in FIGS. 2A and 2B. Please refer to the description in the previous embodiment.

FIGS. 4A-4D and 5A-5B are schematic diagrams of a working process of the mirror assembly provided by an embodiment of the disclosure. The working process of the mirror assembly is described taking the mirror assembly illustrated in FIG. 2A as an example. A voltage is applied to the first rotation electrode 21 and a voltage is applied to the second rotation electrode 22, so that the first rotation electrode 21 and the second rotation electrode 22 are respectively positively charged and negatively charged. The embodiment of the present disclosure is described taking a case where that the first rotation electrode 21 is positively charged and the second rotation electrode 22 is negatively charged as an example. In other embodiments, the first rotation electrode 21 may be negatively charged and the second rotation electrode 22 may be positively charged.

Figure 4A:
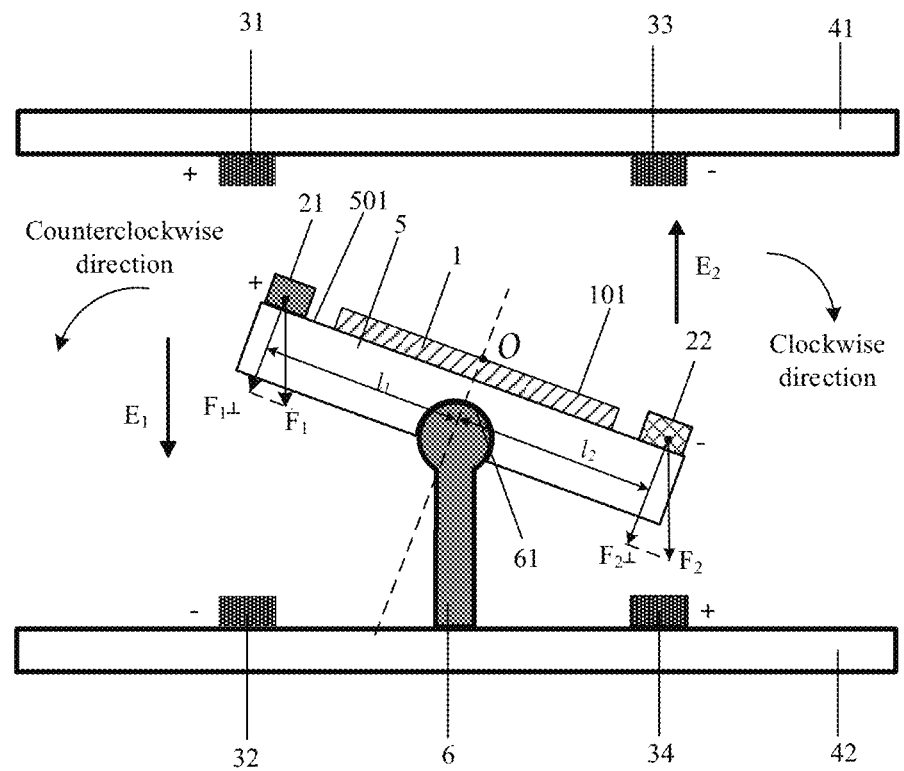
FIGS. 4A-4D and 5A-5B are schematic diagrams of a working process of a mirror assembly provided by an embodiment of the disclosure.
Figure 4B:
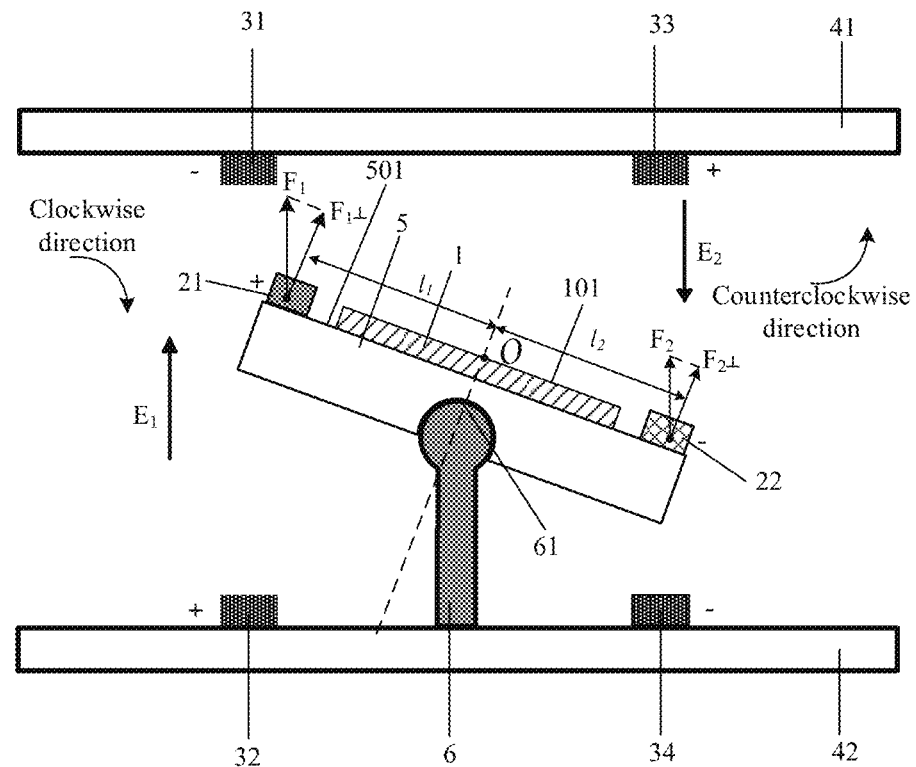

For example, as illustrated in FIGS. 4A and 4B, a direction of the first electric field $E_1$ is opposite to a direction of the second electric field $E_2$, a direction of an electric field force $F_1$ received by the first rotation electrode 21 in the first electric field $E_1$ is identical to a direction of an electric field force $F_2$ received by the second rotation electrode 22 in the second electric field $E_2$, and a value of the electric field force $F_1$ received by the first rotation electrode 21 in the first electric field $E_1$ is different from a value of the electric field force $F_2$ received by the second rotation electrode 22 in the second electric field $E_2$, so as to rotate the first rotation electrode 21 and the second rotation electrode 22 to drive the mirror 1 to rotate around the rotation axis In the embodiment as illustrated in FIG. 4A, for example, a first voltage is applied to the first electrode 31 and a second voltage is applied to the second electrode 32 to form the first electric field $E_1$; a third voltage is applied to the third electrode and a fourth voltage is applied to the fourth electrode to form the second electric field $E_2$ so as to rotate the first rotation electrode 21 and the second rotation electrode 22 to drive the platform 5 to rotate around rotation axis of the platform 5, thereby driving the mirror 1 to rotate around rotation axis of the mirror 1. The direction of the first electric field $E_1$ and the direction of the second electric field $E_2$ are illustrated by arrows in FIG. 4A.

As illustrated in FIG. 4A, the direction of the first electric field force $F_1$ received by the first rotation electrode 21 and the direction of the second electric field force $F_2$ received by the second rotation electrode 22 are toward the second substrate 42. A component force of the first electric field force $F_1$ in a direction perpendicular to the rotation axis of the mirror 1 is $F_1\perp$ and the component force $F_1\perp$ generates a torque that causes the mirror 1 to rotate counterclockwise around the rotation axis; and a component force of the second electric field force $F_2$ in the direction perpendicular to the rotation axis of the mirror 1 is $F_2\perp$. The component force $F_2\perp$ generates a torque that causes the mirror 1 to rotate clockwise around the rotation axis. A first force arm of the component force $F_1\perp$ is $l_1$, and a second force arm of the component force $F_2\perp$ is $l_2$. The first torque generated by the first electric field force $F_1$ which causes the mirror 1 to rotate counterclockwise around the rotation axis 11 is $F_1\perp \times l_1$, and the second torque of the second electric field force $F_2$ which causes the mirror 1 to rotate clockwise around the rotation axis 11 in is $F_2\perp \times l_2$. For example, the electric field intensity of the first electric field $E_1$ and the electric field intensity of the second electric field $E_2$ are adjusted by adjusting the first voltage, the second voltage, the third voltage and the fourth voltage, so that the first torque and the second torque are different, and the mirror 1 rotates clockwise or counterclockwise. For example, in a case where other conditions of the first rotation electrode 21 and the second rotation electrode 22 are same (a gravity of the first rotation electrode 21 is equal to a gravity of the second rotation electrode 22, the platform 5 is axisymmetric and takes the above-mentioned rotation axis 11 as a symmetry axis), the first torque is smaller than the second torque, and the platform 5 and the mirror 1 rotate along the clockwise direction illustrated in FIG. 4A; and in a case where the first torque is greater than the second torque, the platform 5 and the mirror 1 rotate in the counterclockwise direction illustrated in FIG. 4A. In this case, for example, if $l_1=l_2$, it is only required that the value of the first electric field force $F_1$ is different from the value of the second electric field force $F_2$, and in this case, for example, if a total amount of positive charge of the first rotation electrode 21 is also equal to a total amount of negative charge of the second rotation electrode 22, it is only required that the electric field intensity of the first electric field $E_1$ is different from the electric field intensity of the second electric field $E_2$. In this case, in a case where the mirror 1 rotates to the light control position, the electric field intensity of the first electric field $E_1$ and the electric field intensity of the second electric field $E_2$ are adjusted by adjusting the first voltage, the second voltage, the third voltage and the fourth voltage, so that the first torque is equal to the second torque, and thus the mirror 1 is kept at the light control position to realize the adjustment of the light (e.g., laser) incident on the mirror surface 101. For example, the mirror assembly further includes a sensor configured to acquire an angle data of the rotation of the mirror 1 and send the angle data to a controller which processes the angle data and controls the first voltage, the second voltage, the third voltage and the fourth voltage. In this way, the adjustment of the mirror 1 is realized.

For example, in a case where the planar shape of the platform 5 is circular, both the first force arm $l_1$ and the second force arm $l_2$ remain unchanged during the rotation of the platform 5 and the mirror 1, thereby simplifying the calculation of the first torque and the second torque and simplifying the control method of the mirror assembly.

For example, the operation process of the mirror assembly as illustrated in FIG. 4B differs from that as illustrated in FIG. 4A in that the directions of the first electric field $E_1$ and the second electric field $E_2$ are respectively opposite to those as illustrated in FIG. 4A. Both the direction of the first electric field force $F_1$ received by the first rotation electrode 21 and the direction of the second electric field force $F_2$ received by the second rotation electrode 22 face the first substrate 41. The component force of the first electric field force $F_1$ in the direction perpendicular to the rotation axis of the mirror 1 is $F_1\perp$ and the component force $F_1\perp$ generates a torque that causes the mirror 1 to rotate clockwise around the rotation axis; and the component force of the second electric field force $F_2$ in a direction perpendicular to the rotation axis of the mirror 1 is $F_2\perp$. The component force $F_2\perp$ generates a torque that causes the mirror 1 to rotate counterclockwise around the rotation axis. For example, the electric field intensity of the first electric field $E_1$ and the electric field intensity of the second electric field $E_2$ are adjusted by adjusting the first voltage, the second voltage, the third voltage and the fourth voltage, so that the first torque and the second torque are different, and thus the mirror 1 rotates clockwise or counterclockwise. For example, in a case where the other conditions of the first rotation electrode 21 and the second rotation electrode 22 are the same (the gravity of the first rotation electrode 21 is equal to the gravity of the second rotation electrode 22, the platform 5 is axisymmetric and takes the above-mentioned rotation axis 11 as a symmetry axis), and the first torque is greater than the second torque, the platform 5 and the mirror 1 rotates in the clockwise direction illustrated in FIG. 4B. In a case where the first torque is less than the second torque, the platform 5 and the mirror 1 rotate in the counterclockwise direction illustrated in FIG. 4B. In this case, for example, if $l_1=l_2$, it is sufficient to enable the value of the first electric field force F1 and the value of the second electric field force F2 different. For example, in this case, if the total amount of the positive charge of the first rotation electrode 21 is also equal to the total amount of the negative charge of the second rotation electrode 22, it is only required that the electric field intensity of the first electric field $E_1$ is different from the electric field intensity of the second electric field $E_2$. In this case, in a case where the mirror 1 rotates to the light control position, by adjusting the first voltage, the second voltage, the third voltage and the fourth voltage to adjust the electric field intensity of the first electric field $E_1$ and the electric field intensity of the second electric field $E_2$ so that the first torque is equal to the second torque, the mirror 1 is kept at the light control position to realize the adjustment of the light (e.g., laser) incident on the mirror surface 101.

Figure 4C:
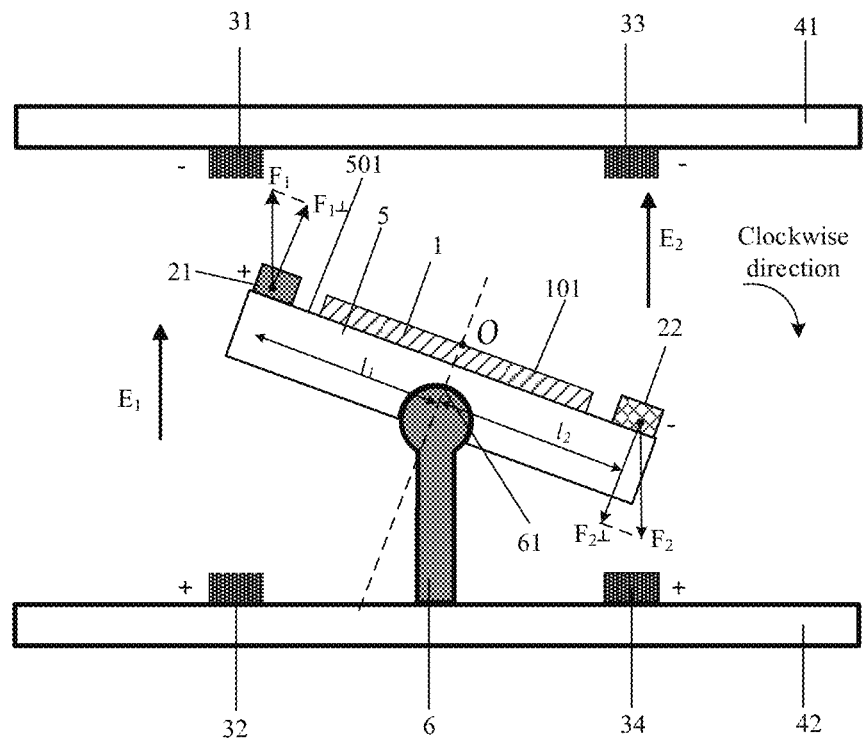

For example, as illustrated in FIG. 4C, the direction of the first electric field $E_1$ is same as the direction of the second electric field $E_2$, and the direction of the first electric field force $F_1$ received by the first rotation electrode 21 in the first electric field $E_1$ is opposite to the direction of the second electric field force $F_2$ received by the second rotation electrode in the second electric field, so as to rotate the first rotation electrode 21 and the second rotation electrode 22 to drive the mirror 1 to rotate around the rotation axis of the mirror 1.

As illustrated in FIG. 4C, the direction of the first electric field force $F_1$ received by the first rotation electrode 21 is toward the first substrate 41, and the direction of the second electric field force $F_2$ received by the second rotation electrode 22 is toward the second substrate 42. The component force of the first electric field force $F_1$ in the direction perpendicular to the rotation axis of the mirror 1 is $F_1\perp$ and the component force $F_1\perp$ generates a torque that causes the mirror 1 to rotate clockwise around the rotation axis; and the component force of the second electric field force $F_2$ in the direction perpendicular to the rotation axis of the mirror 1 is $F_2\perp$. The component force $F_2\perp$ also generates a torque that causes the mirror 1 to rotate clockwise around the rotation axis. A first force arm of the component force $F_1$ is $l_1$, and a second force arm of the component force $F_2$ is $l_2$. The first torque generated by the first electric field force $F_1$ that causes the mirror 1 to rotate clockwise around the rotation axis 11 is $F_1\perp \times l_1$, and the second torque generated by the second electric field force $F_2$ that causes the mirror 1 clockwise to rotate around the rotation axis 11 is $F_2\perp \times l_2$. For example, the electric field intensity of the first electric field $E_1$ and the electric field intensity of the second electric field $E_2$ are adjusted by adjusting the first voltage, the second voltage, the third voltage and the fourth voltage, so that the first torque and the second torque are adjusted, and thus the mirror 1 rotates clockwise. When the mirror 1 is rotated to the light control position, the direction of the first electric field $E_1$ is controlled to be opposite to the direction of the second electric field $E_2$ by adjusting the first voltage, the second voltage, the third voltage and the fourth voltage, that is, the direction of the first electric field $E_1$ and the direction of the second electric field $E_2$ are changed from the situation illustrated in FIG. 4C to the situation illustrated in FIG. 4A or 4B, and the electric field intensity of the first electric field $E_1$ and the electric field intensity of the second electric field $E_2$ are adjusted so that the first torque is equal to the second torque to keep the mirror 1 at the light control position, thereby realizing the adjustment of the light (e.g., laser) incident on the mirror surface 101. For example, the mirror assembly further includes a sensor configured to acquire the angle data of the rotation of the mirror 1 and send the angle data to the controller which processes the angle data and controls the first voltage, the second voltage, the third voltage and the fourth voltage. In this way, the adjustment of the mirror 1 is realized.

Figure 4D:
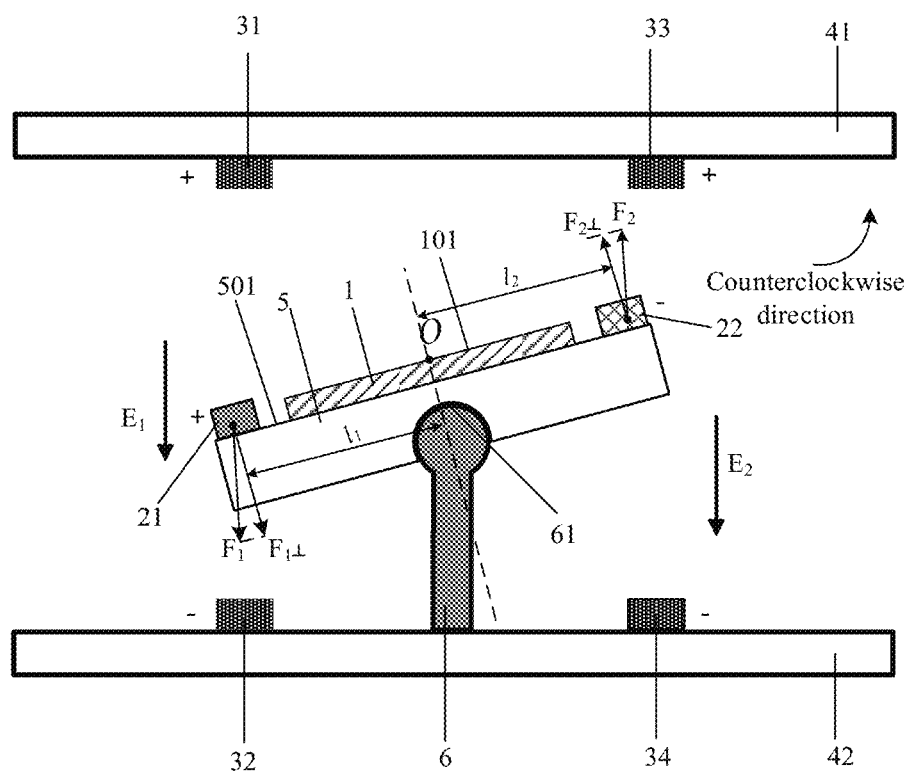

Similarly, as illustrated in FIG. 4D, the direction of the first electric field force $F_1$ received by the first rotation electrode 21 is toward the second substrate 42, and the direction of the second electric field force $F_2$ received by the second rotation electrode 22 is toward the first substrate 41. A component force of the first electric field force $F_1$ in the direction perpendicular to the rotation axis of the mirror 1 is $F_1 \perp$ and the component force $F_1 \perp$ generates the torque that causes the mirror 1 to rotate counterclockwise around the rotation axis; the component force of the second electric field force $F_2$ in the direction perpendicular to the rotation axis of the mirror 1 is $F_2 \perp$. The component force $F_2 \perp$ also generates a torque that causes the mirror 1 to rotate counterclockwise around the rotation axis. A first force arm of the component force $F_1$ is $l_1$, and a second force arm of the component force $F_2$ is $l_2$. The first torque generated by the first electric field force $F_1$ which causes the mirror 1 to rotate counterclockwise around the rotation axis 11 is $F_1 195 \times l_1$, and the second torque generated by the second electric field force $F_2$ which causes the mirror 1 to rotate counterclockwise around the rotation axis 11 is $F_2 \perp \times l_2$. For example, the electric field intensity of the first electric field $E_1$ and the electric field intensity of the second electric field $E_2$ are adjusted by adjusting the first voltage, the second voltage, the third voltage and the fourth voltage, so that the first torque and the second torque are adjusted, and thus the mirror 1 rotates counterclockwise. When the mirror 1 rotates to the light control position, the first voltage the second voltage, the third voltage and the fourth voltage are adjusted so that the direction of the first electric field $E_1$ is opposite to the direction of the second electric field $E_2$, that is, the direction of the first electric field $E_1$ and the direction of the second electric field $E_2$ are changed from the situation illustrated in FIG. 4D to the situation illustrated in FIG. 4A or FIG. 4B, and the electric field intensity of the first electric field $E_1$ and the electric field intensity of the second electric field $E_2$ are adjusted so that the first torque is equal to the second torque to keep the mirror 1 at the light control position, thereby realizing the adjustment of the light (e.g., laser) incident on the mirror surface 101.

Figure 5A:
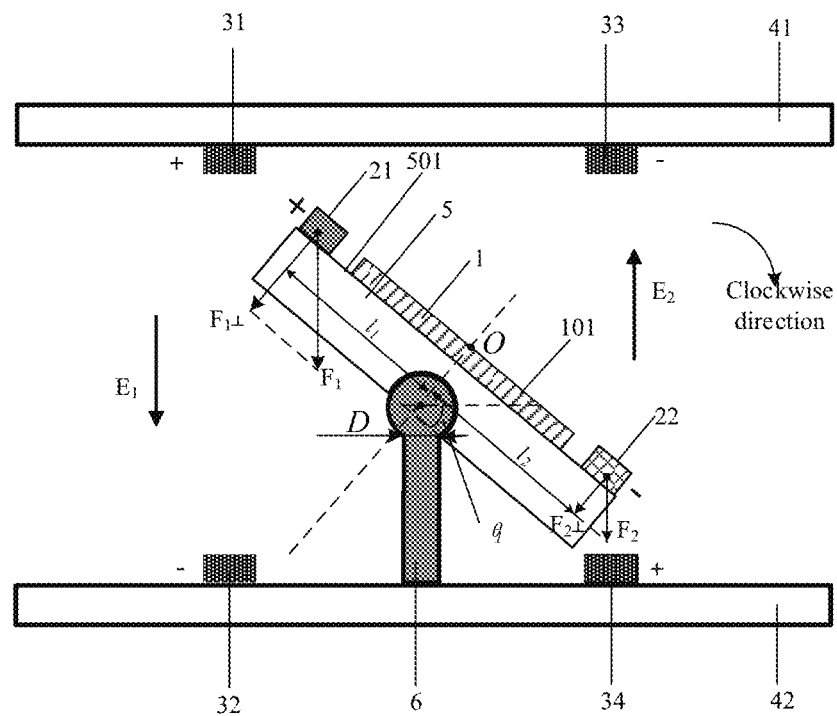
Figure 5B:
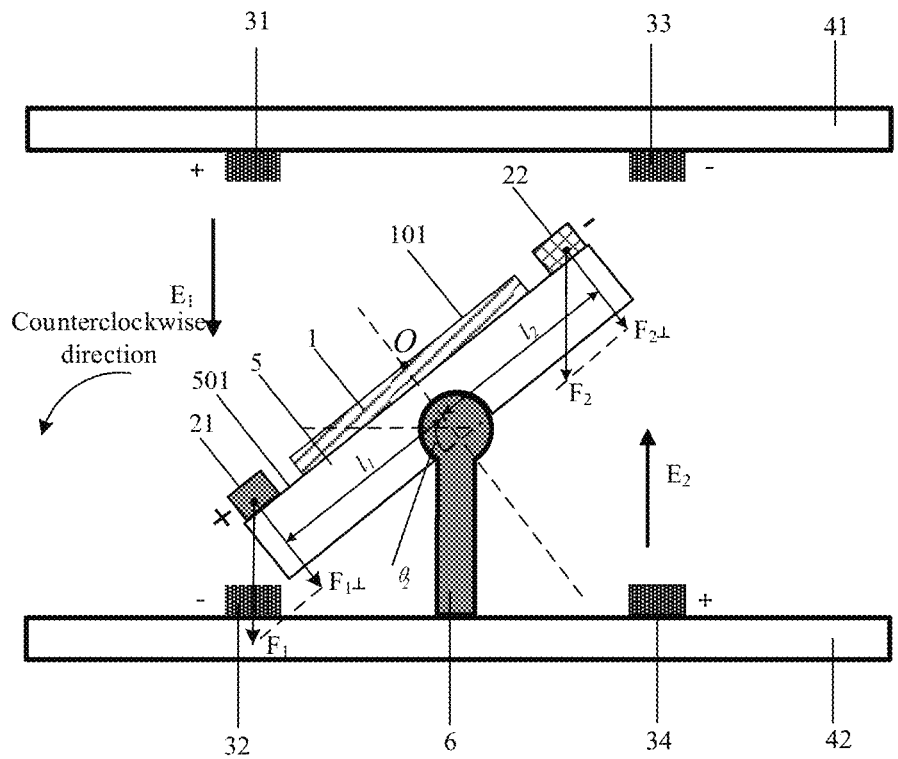

FIG. 5A shows a case where a rotation angle of the mirror 1 in the clockwise rotation is the largest in an embodiment of the present disclosure, and the maximum rotation angle is the angle $\theta_1$; FIG. 5B shows a case where a rotation angle of the mirror 1 in the counterclockwise direction is the largest in an embodiment of the present disclosure, and the maximum rotation angle is the angle $\theta_2$. For example, a value of the angle $\theta_1$ and a value of the angle $\theta_2$ can be adjusted by adjusting the above-mentioned dimension l of the opening of the groove on the second surface of the platform 5 or the dimension D (as illustrated in FIG. 5A) of an end, which is close to the supporting portion 61, of the second spherical surface of the rotation portion 62. The value of the angle $\theta_1$ and the value of the angle $\theta_2$ can be designed as required, and the range of the value of the angle $\theta_1$ and the value of the angle $\theta_2$ is relatively large.

Figure 6A:
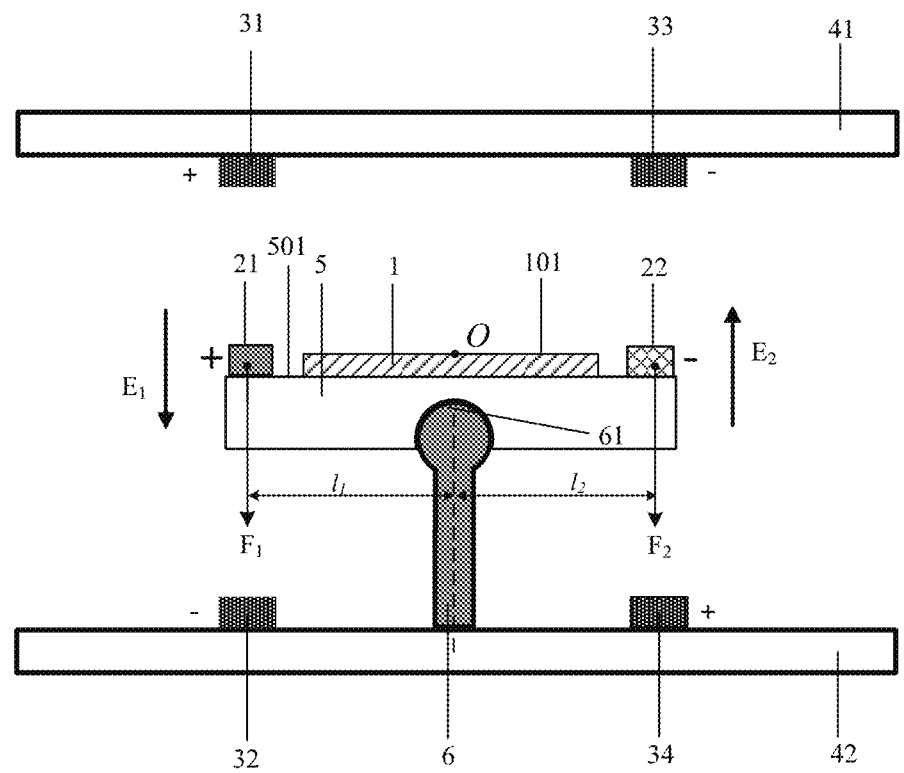
FIG. 6A is a structural schematic diagram of further another mirror assembly provided by an embodiment of the disclosure.
Figure 6B:
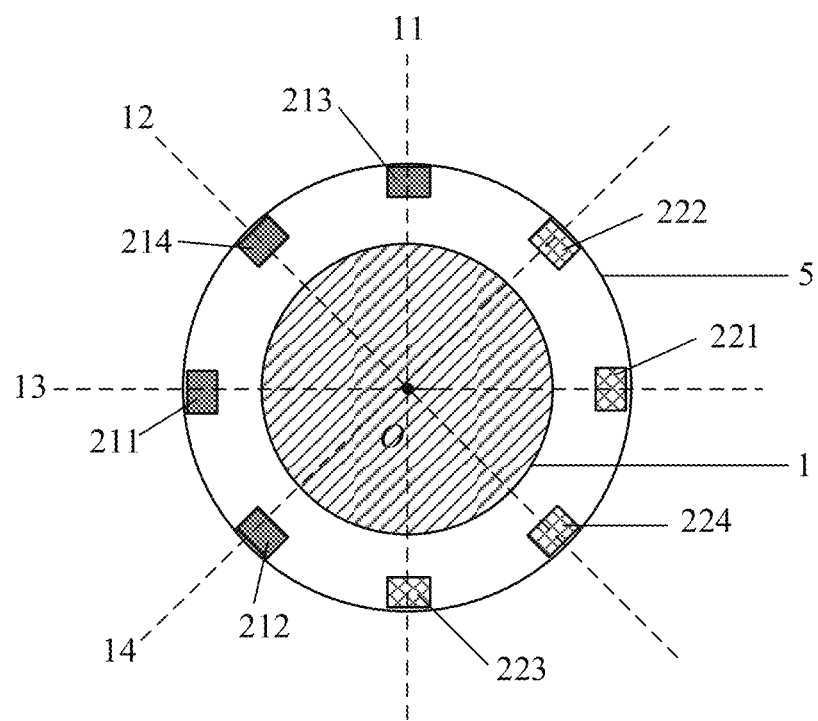
FIG. 6B is a planar schematic diagram of the mirror assembly as illustrated in FIG. 6A.

FIG. 6A is a structural schematic diagram of further another mirror assembly provided by an embodiment of the disclosure, and FIG. 6B is a planar schematic diagram of the mirror assembly illustrated in FIG. 6A. For example, the mirror surface includes a plurality of rotation axes that intersect to each other, and the first rotation electrode, the second rotation electrode, the first electrode, the second electrode, the third electrode and the fourth electrode are provided correspondingly for each of the plurality of the rotation axes. For example, in the embodiment illustrated in FIG. 6A, the mirror assembly includes four rotation axes, namely, a first rotation axis 11, a second rotation axis 12, a third rotation axis 13 and a fourth rotation axis 14, and the four rotation axes intersect with each other. Furthermore, the first rotation electrode 211 and the second rotation electrode 221 are provided for the first rotation axis 11, the first rotation electrode 212 and the second rotation electrode 222 are provided for the second rotation axis 12, the first rotation electrode 213 and the second rotation electrode 223 are provided for the third rotation axis 13, and the first rotation electrode 214 and the second rotation electrode 224 are provided for the fourth rotation axis 14. The first electrode 31, the second electrode 32, the third electrode 33 and the fourth electrode 34 as illustrated in FIG. 6A are provided for each of the four rotation axes. In a case where electric signals are applied to the first rotation electrode 211, the second rotation electrode 221 as well as the corresponding first electrode 31, the second electrode 32, the third electrode 33 and the fourth electrode 34, the first rotation electrode 211 is controlled by an electric field force in the first electric field generated by the corresponding first electrode 31 and the second electrode 32, and the second rotation electrode 221 is controlled by an electric field force in the second electric field generated by the corresponding third electrode 33 and the fourth electrode 34, so that the first rotation electrode 211 and the second rotation electrode 221 rotate around the first rotation axis 11, thereby driving the mirror 1 to rotate around the first rotation axis 11. In a case where electric signals are applied to the first rotation electrode 212, the second rotation electrode 222 as well as the corresponding first electrode 31, the second electrode 32, the third electrode 33 and the fourth electrode 34, the first rotation electrode 212 is controlled by the electric field force in the first electric field generated by the corresponding first electrode 31 and the second electrode 32, and the second rotation electrode 222 is controlled by the electric field force in the second electric field generated by the corresponding third electrode 33 and the fourth electrode 34, so that the first rotation electrode 212 and the second rotation electrode 222 rotate around the second rotation axis 12, thereby driving the mirror 1 to rotate around the second rotation axis 12. In a case where electric signals are applied to the first rotation electrode 213, the second rotation electrode 223, as well as the corresponding first electrode 31, the second electrode 32, the third electrode 33 and the fourth electrode 34, the first rotation electrode 213 is controlled by the electric field force in the first electric field generated by the corresponding first electrode 31 and the second electrode 32, and the second rotation electrode 223 is controlled by the electric field force in the second electric field generated by the corresponding third electrode 33 and the fourth electrode 34, so that the first rotation electrode 213 and the second rotation electrode 223 rotate around the third rotation axis 13, thereby driving the mirror 1 to rotate around the third rotation axis 13. In a case where electric signals are applied to the first rotation electrode 214, the second rotation electrode 224, as well as the corresponding first electrode 31, the second electrode 32, the third electrode 33 and the fourth electrode 34, the first rotation electrode 214 is controlled by the electric field force in the first electric field generated by the corresponding first electrode 31 and the second electrode 32, and the second rotation electrode 224 is controlled by the electric field force in the second electric field generated by the corresponding third electrode 33 and the fourth electrode 34, so that the first rotation electrode 214 and the second rotation electrode 224 rotate around the fourth rotation axis 14, thereby driving the mirror 1 to rotate around the fourth rotation axis 14. Therefore, by adopting the mirror assembly, positions of the activated first electrode, the second electrode, the third electrode and the fourth electrode is controlled so as to control positions of the first electric field and the second electric field, thereby controlling positions of the first rotation electrode and the second rotation electrode which rotate around the corresponding axis, that is, controlling a position of the rotation axis of the mirror and the rotation direction of the mirror, realizing that the mirror can rotate around the rotation axes in multiple directions in the plane where the mirror surface is located, and realizing various adjustment modes according to the light (such as laser) incident on the mirror surface as required.

As illustrated in FIG. 6B, for example, the planar shape of the mirror 1 is a circle, the plurality of first rotation electrodes 211/212/213/214 and the plurality of second rotation electrodes 221/222/223/224 are arranged along a concentric ring of the circle. In this way, when the mirror 1 rotates around different rotation axes, the force arms of the electric field forces applied to the first rotation electrode and the second rotation electrode which rotate around the rotation axis are fixed, that is, the force arms of the electric field forces playing a role of rotating the mirror 1 around the rotation axis 11 are fixed, so that the calculation of the torque during the rotation of the mirror 1 is simplified, and thus it is convenient to adjust and control the required electric field intensity $E_1$ of the first electric field and the electric field intensity $E_2$ of the second electric field.

Figure 6C:
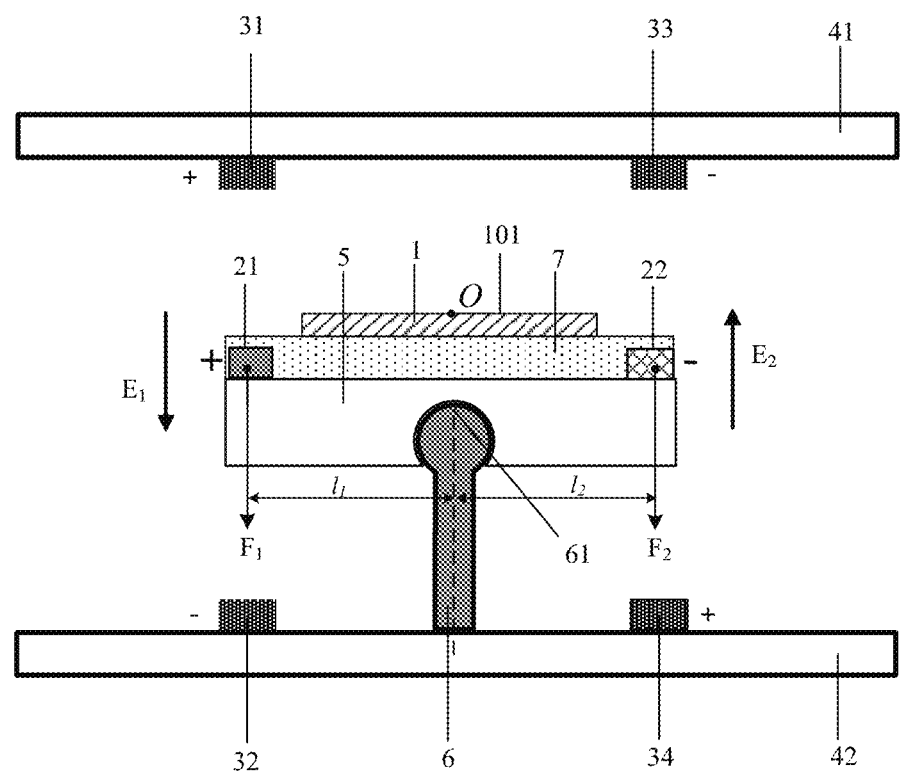
FIG. 6C is a structural schematic diagram of further another mirror assembly provided by an embodiment of the disclosure.
Figure 6D:
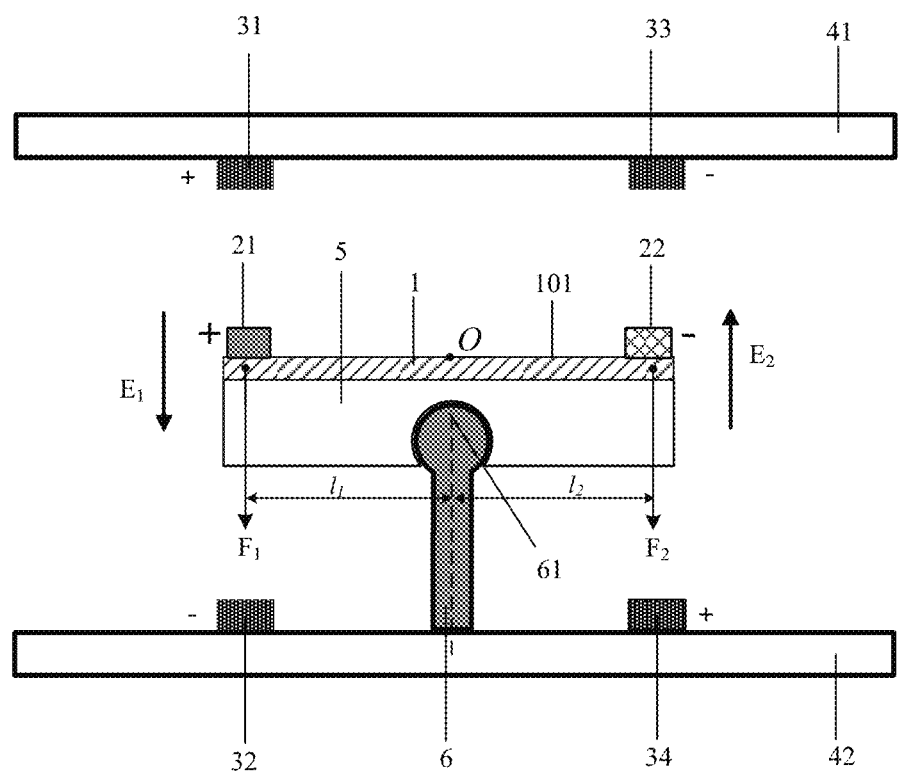
FIG. 6D is a structural schematic diagram of another mirror assembly provided by an embodiment of the disclosure.

FIG. 6C is a structural schematic diagram of further another mirror assembly provided by an embodiment of the disclosure, and FIG. 6D is a structural schematic diagram of further another mirror assembly provided by an embodiment of the disclosure. In the embodiment illustrated in FIG. 6A, the first rotation electrode 21, the second rotation electrode 22 and the mirror 1 are in a same layer, and the mirror surface 101 is substantially parallel to the first surface 501 of the platform 5. In the embodiment illustrated in FIG. 6B, the mirror assembly further includes a flat layer 7 covering the first rotation electrode 21 and the second rotation electrode 22, the mirror 1 is on the flat layer 7, and the mirror surface 101 is substantially parallel to the first surface 501 of the platform 5. In the embodiment illustrated in FIG. 6C, the first rotation electrode 21 and the second rotation electrode 22 are on the mirror 1, for example, the first rotation electrode 21 and the second rotation electrode 22 are in contact with the mirror 1. Other features of the embodiment as illustrated in FIGS. 6B and 6C are the same as those of the previous embodiment, please refer to the previous description.

For example, in at least one embodiment of the present disclosure, the mirror 1 is a micro-mirror, that is, the size of the mirror 1 is at the micron level, for example, tens of microns.

At least one embodiment of the present disclosure also provides a light adjusting board which includes a plurality of mirror assemblies, and the plurality of the mirror assemblies are arranged in an array and are independently controlled respectively.

For example, the light adjusting board further includes a micro-electro-mechanical system (MEMS) configured to control the electrical signals applied to the first rotation electrode, the second rotation electrode, the first electrode, the second electrode, the third electrode and the fourth electrode. For example, in a case where the mirror assembly includes the plurality of the rotation axes, the MEMS can control the rotation direction of the mirror. The light adjusting board provided by the embodiment of the disclosure can adjust light by rotation the plurality of mirrors arranged in an array under the control of the electric field force.

At least one embodiment of the present disclosure further provides a control method of a mirror assembly, and the control method is applicable to the above-mentioned mirror assembly. The control method includes: applying a voltage to the first rotation electrode and applying a voltage to the second rotation electrode so that the first rotation electrode and the second rotation electrode are respectively positively charged and negatively charged; and applying a first voltage to the first electrode and applying a second voltage to the second electrode to form the first electric field, and applying a third voltage to the third electrode and applying a fourth voltage to the fourth electrode to form the second electric field to rotate the first rotation electrode and the second rotation electrode to drive the mirror to rotate around the rotation axis. For example, the mirror assembly is connected with a micro-electromechanical system, and the micro-electromechanical system includes a power supply, and voltages are applied to the first rotation electrode and the second rotation electrode, the first electrode, the second electrode, the third electrode and the fourth electrode through the micro-electromechanical system.

For example, by adjusting the first voltage, the second voltage, the third voltage and the fourth voltage, a direction of the first electric field is controlled to be opposite to a direction of the second electric field, a direction of the electric field force received by the first rotation electrode in the first electric field is identical to a direction of the electric field force received by the second rotation electrode in the second electric field, and a value of the electric field force received by the first rotation electrode in the first electric field is different from a value of the electric field force received by the second rotation electrode in the second electric field, so that the first rotation electrode and the second rotation electrode rotate around the rotation axis of the mirror to drive the mirror to rotate around the rotation axis of the mirror. When the mirror is rotated to the light control position, the direction of the first electric field is kept opposite to the direction of the second electric field by adjusting the first voltage, the second voltage, the third voltage and the fourth voltage, so as to kept the direction of the electric field force received by the first rotation electrode in the first electric field opposite to the direction of the electric field force received by the second rotation electrode in the second electric field, and the value of the electric field force received by the first rotation electrode in the first electric field and/or the value of the electric field force received by the second rotation electrode in the second electric field are adjusted to keep the mirror at the light control position. Please refer to the previous description of FIGS. 4A-4B for specific methods which are not be repeated here again.

Or, by adjusting the first voltage, the second voltage, the third voltage and the fourth voltage, the direction of the first electric field is identical to the direction of the second electric field, the direction of the electric field force received by the first rotation electrode in the first electric field is opposite to the direction of the electric field force received by the second rotation electrode in the second electric field, so that the first rotation electrode and the second rotation electrode rotate around the rotation axis of the mirror to drive the mirror to rotate around the rotation axis. In a case where the direction of the first electric field is identical to the direction of the second electric field, when the mirror is rotated to the light control position, the direction of the first electric field is turned to be opposite to the direction of the second electric field by adjusting the first voltage, the second voltage, the third voltage and the fourth voltage, so that the direction of the electric field force received by the first rotation electrode in the first electric field is opposite to the direction of the electric field force received by the second rotation electrode in the second electric field, and the value of the electric field force received by the first rotation electrode in the first electric field and/or the value of the electric field force received by the second rotation electrode in the second electric field are adjusted to keep the mirror at the light control position. Please refer to the previous description of FIGS. 4C-4D for specific methods which are not be repeated here again.

The above is only exemplary embodiments of the present invention, and is not intended to limit the scope of the present disclosure. The scope of the present disclosure is defined by the appended claims.

What is claimed is:

1. A mirror assembly, comprising:
   a mirror, comprising a mirror surface and a rotation axis in the mirror surface;
   a first rotation electrode and a second rotation electrode, wherein an orthographic projection of the first rotation electrode and an orthographic projection of the second rotation electrode on a plane where the mirror surface is located are respectively at two sides of the rotation axis, and a connection line connecting the first rotation electrode and the second rotation electrode is perpendicular to the rotation axis;
   a first electrode and a second electrode which are opposite to each other to form a first electric field, wherein the first rotation electrode is between the first electrode and the second electrode so that the first rotation electrode is in the first electric field; and
   a third electrode and a fourth electrode which are opposite to each other to form a second electric field, wherein the second rotation electrode is between the third electrode and the fourth electrode so that the second rotation electrode is in the second electric field,
   wherein the first rotation electrode and the second rotation electrode are configured to rotate under a control of the first electric field and the second electric field, to drive the mirror to rotate around the rotation axis.

2. The mirror assembly according to claim 1, further comprising a first substrate and a second substrate which are opposite to each other,
   wherein the first electrode and the third electrode are on the first substrate, and the second electrode and the fourth electrode are on the second substrate; and
   the mirror, the first rotation electrode and the second rotation electrode are between the first substrate and the second substrate.

3. The mirror assembly according to claim 2, wherein
   an orthographic projection of the first rotation electrode on the first substrate at least partially overlaps the first electrode and at least partially overlaps an orthographic projection of the second electrode on the first substrate; and
   an orthographic projection of the second rotation electrode on the first substrate at least partially overlaps the third electrode and at least partially overlaps an orthographic projection of the fourth electrode on the first substrate.

4. The mirror assembly according to claim 1, further comprising: a platform having a rotation axis and a first surface,
   wherein an orthographic projection of the rotation axis of the platform on the plane where the mirror surface is located coincides with the rotation axis of the mirror; and
   the first surface is a surface of the platform facing the first rotation electrode, the second rotation electrode and the mirror; the mirror, the first rotation electrode and the second rotation electrode are on the first surface of the platform, and the first rotation electrode and the second rotation electrode are configured to rotate to drive the platform to rotate so as to drive the mirror to rotate.

5. The mirror assembly according to claim 4, further comprising:
   a supporting rotation structure, comprising an end rotationally connected with the platform, wherein the end of the supporting rotation structure is on the rotation axis of the platform.

6. The mirror assembly according to claim 5, wherein
   a groove is on a second surface, which is opposite to the first surface, of the platform, and an inner wall of the groove is a first spherical surface;
   the supporting rotation structure comprises a supporting potion and a rotation potion connected with the supporting potion, the rotation potion comprises the end of the supporting rotation structure, a shape of the rotation potion is a sphere, the sphere comprises a second spherical surface, and at least a portion of the second spherical surface is in the groove; and
   the second spherical surface is configured to be rotatable relative to the first spherical surface.

7. The mirror assembly according to claim 6, wherein the first spherical surface is larger than a surface of a hemisphere and the second spherical surface is larger than a surface of a hemisphere.

8. The mirror assembly according to claim 6, wherein
   the platform comprises a first portion and a second portion connected to each other;
   the first potion comprises a first sub-groove, and an inner wall of the first sub-groove is a first sub-spherical surface;
   the second potion comprises a second sub-groove, and an inner wall of the second sub-groove is a second sub-spherical surface; and
   the groove is a combination of the first sub-groove and the second sub-groove.

9. The mirror assembly according to claim 8, wherein the first sub-spherical surface is smaller than a hemispherical surface and larger than a quarter spherical surface, and the second sub-spherical surface is smaller than a hemispherical surface and larger than a quarter spherical surface.

10. The mirror assembly according to claim 5, wherein a planar shape of the platform is a circle, and the end of the supporting rotation structure is at a center of the circle.

11. The mirror assembly according to claim 4, wherein
    the first rotation electrode, the second rotation electrode and the mirror are in a same layer, and the mirror surface is substantially parallel to the first surface of the platform; or,
    the mirror assembly further comprises a flat layer covering the first rotation electrode and the second rotation electrode, the mirror is on the flat layer, and the mirror surface is substantially parallel to the first surface of the platform; or,
    the first rotation electrode and the second rotation electrode are on the mirror.

12. The mirror assembly according to claim 1, wherein the mirror surface comprises a plurality of rotation axes, wherein the plurality of rotation axes intersect to each other, and the first rotation electrode, the second rotation electrode, the first electrode, the second electrode, the third electrode and the fourth electrode are provided for each of the plurality of rotation axes.

13. The mirror assembly according to claim 12, wherein a planar shape of the mirror is a circle, and the plurality of first rotation electrodes and the plurality of second rotation electrodes are arranged along a concentric ring of the circle.

14. The mirror assembly according to claim 1, wherein
a direction of the first electric field is opposite to a direction of the second electric field, a direction of an electric field force received by the first rotation electrode in the first electric field is identical to a direction of an electric field force received by the second rotation electrode in the second electric field and a value of the electric field force received by the first rotation electrode in the first electric field is different from a value of the electric field force received by the second rotation electrode in the second electric field, so as to rotate the first rotation electrode and the second rotation electrode to drive the mirror to rotate around the rotation axis; or,
the direction of the first electric field is identical to the direction of the second electric field, and the direction of the electric field force received by the first rotation electrode in the first electric field is opposite to the direction of t the electric field force received by the second rotation electrode in the second electric field so as to rotate the first rotation electrode and the second rotation electrode to drive the mirror to rotate around the rotation axis.

15. The mirror assembly according to claim 2, wherein
the orthographic projection of the first rotation electrode on the first substrate at least partially overlaps the first electrode and at least partially overlaps an orthographic projection of the second electrode on the first substrate;
the orthographic projection of the second rotation electrode on the first substrate at least partially overlaps the third electrode and at least partially overlaps an orthographic projection of the fourth electrode on the first substrate;
the mirror assembly further comprises:
a platform having a rotation axis and a first surface, wherein an orthographic projection of the rotation axis of the platform on the plane where the mirror surface is located coincides with the rotation axis of the mirror; and the first surface is a surface of the platform facing the first rotation electrode; the mirror, the first rotation electrode and the second rotation electrode are on the first surface of the platform, and the first rotation electrode and the second rotation electrode are configured to rotate to drive the platform to rotate so as to drive the mirror to rotate; and
a supporting rotation structure comprising an end rotationally connected with the platform,
wherein the end of the supporting rotation structure is on the rotation axis of the platform;
a groove is on a second surface, which is opposite to the first surface, of the platform, and an inner wall of the groove is a first spherical surface; the supporting rotation structure comprises a supporting potion and a rotation potion connected with the supporting potion, the rotation potion comprises the end of the supporting rotation structure, a shape of the rotation potion is a sphere, the sphere comprises a second spherical surface, and at least a portion of the second spherical surface is in the groove; and the second spherical surface is configured to be rotatable relative to the first spherical surface;
the first spherical surface is larger than a surface of a hemisphere and the second spherical surface is larger than a surface of a hemisphere;
a planar shape of the platform is a circle, and the end of the supporting rotation structure is at a center of the circle;
the mirror surface comprises a plurality of rotation axes, wherein the plurality of rotation axes intersect to each other, and the first rotation electrode, the second rotation electrode, the first electrode, the second electrode, the third electrode, and the fourth electrode are provided for each of the plurality of rotation axes; and
a planar shape of the mirror is a circle, and the plurality of first rotation electrodes and the plurality of second rotation electrodes are arranged along a concentric ring of the circle.

16. A light adjusting board, comprising a plurality of mirror assemblies according to claim 1, wherein the plurality of mirror assemblies are arranged in an array and are independently controlled.

17. The light adjusting board according to claim 16, further comprising: a micro-electro-mechanical system configured to control electrical signals respectively applied to the first rotation electrode, the second rotation electrode, the first electrode, the second electrode, the third electrode and the fourth electrode.

18. A control method of a mirror assembly which is applicable to the mirror assembly of claim 1, comprising:
applying a voltage to the first rotation electrode and applying a voltage to the second rotation electrode so that the first rotation electrode and the second rotation electrode are respectively positively charged and negatively charged; and
applying a first voltage to the first electrode and applying a second voltage to the second electrode to form the first electric field, and applying a third voltage to the third electrode and applying a fourth voltage to the fourth electrode to form the second electric field to rotate the first rotation electrode and the second rotation electrode to drive the mirror to rotate around the rotation axis.

19. The control method of the mirror assembly according to claim 18, wherein
by adjusting the first voltage, the second voltage, the third voltage and the fourth voltage, a direction of the first electric field is opposite to a direction of the second electric field, a direction of the electric field force received by the first rotation electrode in the first electric field is identical to a direction of the electric field force received by the second rotation electrode in the second electric field, and a value of the electric field force received by the first rotation electrode in the first electric field is different from a value of the electric field force received by the second rotation electrode in the second electric field, so that the first rotation electrode and the second rotation electrode rotate around the rotation axis of the mirror to drive the mirror to rotate around the rotation axis of the mirror; or
by adjusting the first voltage, the second voltage, the third voltage and the fourth voltage, the direction of the first electric field is identical to the direction of the second electric field, the direction of the electric field force received by the first rotation electrode in the first electric field is opposite to the direction of the electric field force received by the second rotation electrode in the second electric field, so that the first rotation electrode and the second rotation electrode rotate around the rotation axis of the mirror to drive the mirror to rotate around the rotation axis.

20. The control method of the mirror assembly according to claim 19, wherein the direction of the first electric field is opposite to the direction of the second electric field, after the mirror is rotated to a light control position, the direction of the first electric field is kept opposite to the direction of the second electric field by adjusting the first voltage, the second voltage, the third voltage and the fourth voltage, so as to kept the direction of the electric field force received by the first rotation electrode in the first electric field opposite to the direction of the electric field force received by the second rotation electrode in the second electric field, and the value of the electric field force received by the first rotation electrode in the first electric field and/or the value of the electric field force received by the second rotation electrode in the second electric field are adjusted to keep the mirror at the light control position; or the direction of the first electric field is identical to the direction of the second electric field, after the mirror is rotated to the light control position, the direction of the first electric field is turned to be opposite to the direction of the second electric field by adjusting the first voltage, the second voltage, the third voltage and the fourth voltage, so that the direction of the electric field force received by the first rotation electrode in the first electric field is opposite to the direction of the electric field force received by the second rotation electrode in the second electric field, and the value of the electric field force received by the first rotation electrode in the first electric field and/or the value of the electric field force received by the second rotation electrode in the second electric field are adjusted to keep the mirror at the light control position.

\* \* \* \* \*